(12) United States Patent
Fuller et al.

(10) Patent No.: US 8,050,806 B2
(45) Date of Patent: Nov. 1, 2011

(54) GROUND FAULT INTERRUPTION USING DSP BASED SSPC MODULE

(75) Inventors: Randy J. Fuller, Hillsburgh (CA); Zhenning Z. Liu, Mississauga (CA); Milind Ghanekar, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 1026 days.

(21) Appl. No.: 11/938,052

(22) Filed: Nov. 9, 2007

(65) Prior Publication Data

US 2008/0234879 A1 Sep. 25, 2008

Related U.S. Application Data

(60) Provisional application No. 60/896,213, filed on Mar. 21, 2007.

(51) Int. Cl.
 *G05B 19/18* (2006.01)
 *G05B 19/02* (2006.01)
 *G05D 17/001* (2006.01)
(52) U.S. Cl. ............ 701/3; 701/1; 700/9; 700/293
(58) Field of Classification Search ......... 701/3; 361/45
 See application file for complete search history.

(56) References Cited

U.S. PATENT DOCUMENTS

| | | | | |
|---|---|---|---|---|
| 5,386,147 A | * | 1/1995 | Bonneau et al. ........... 307/64 |
| 5,793,587 A | | 8/1998 | Boteler | |
| 5,838,216 A | * | 11/1998 | White et al. ........... 333/182 |
| 5,854,731 A | * | 12/1998 | Thomas ........... 361/93.8 |
| 5,945,802 A | * | 8/1999 | Konrad et al. ........... 318/807 |
| 6,356,423 B1 | * | 3/2002 | Hastings et al. ........... 361/93.2 |
| 6,801,117 B2 | * | 10/2004 | Morris et al. ........... 337/401 |
| 7,007,179 B2 | * | 2/2006 | Mares et al. ........... 713/310 |
| 7,130,170 B2 | | 10/2006 | Wakefield et al. | |
| 7,162,653 B2 | | 1/2007 | Mares et al. | |
| 7,177,125 B2 | * | 2/2007 | Lazarovich et al. ........... 361/42 |
| 7,505,820 B2 | * | 3/2009 | Plivcic et al. ........... 700/22 |
| 7,538,454 B2 | * | 5/2009 | Yu et al. ........... 307/100 |
| 7,598,625 B2 | * | 10/2009 | Yu et al. ........... 307/9.1 |
| 7,633,272 B2 | * | 12/2009 | Yao et al. ........... 322/59 |
| 7,634,329 B2 | * | 12/2009 | Liu et al. ........... 700/292 |
| 7,706,116 B2 | * | 4/2010 | Liu et al. ........... 361/93.1 |
| 7,747,879 B2 | * | 6/2010 | Tofigh et al. ........... 713/300 |
| 7,805,204 B2 | * | 9/2010 | Ghanekar et al. ........... 700/22 |
| 7,868,621 B2 | * | 1/2011 | Liu et al. ........... 324/512 |
| 2006/0087782 A1 | * | 4/2006 | Michalko et al. ........... 361/62 |
| 2006/0101296 A1 | * | 5/2006 | Mares et al. ........... 713/300 |
| 2006/0279969 A1 | * | 12/2006 | Leung et al. ........... 363/41 |
| 2008/0155293 A1 | * | 6/2008 | Skendzic et al. ........... 713/340 |
| 2008/0174928 A1 | * | 7/2008 | Liu et al. ........... 361/93.1 |
| 2008/0197699 A1 | * | 8/2008 | Yu et al. ........... 307/9.1 |

(Continued)

FOREIGN PATENT DOCUMENTS

WO  WO 02087051  10/2002

*Primary Examiner* — Khoi Tran
*Assistant Examiner* — Ian Jen
(74) *Attorney, Agent, or Firm* — Miriam Jackson, Esq.

(57) ABSTRACT

A ground fault interruption (GFI) system is incorporated onto a DSP based LRM of an aerospace vehicle. The GFI system operates with digital controls and, unlike the prior art, the system does not employ current transformers. Synchronization pulses are employed to coordinate instantaneous current measurement samplings in each phase of a multi-phase power system. Coordinated sampling may reduce phase angle current differential errors and improve operational precision of the GFI system.

13 Claims, 3 Drawing Sheets

U.S. PATENT DOCUMENTS

| | | | |
|---|---|---|---|
| 2008/0217471 A1* | 9/2008 | Liu et al. | 244/1 R |
| 2008/0231112 A1* | 9/2008 | Fuller et al. | 307/9.1 |
| 2008/0234838 A1* | 9/2008 | Ghanekar et al. | 700/22 |
| 2008/0303353 A1* | 12/2008 | Yu et al. | 307/131 |
| 2009/0021874 A1* | 1/2009 | Divito et al. | 361/57 |
| 2009/0072797 A1* | 3/2009 | Yao et al. | 322/19 |
| 2009/0122454 A1* | 5/2009 | Gayowsky et al. | 361/103 |
| 2009/0135628 A1* | 5/2009 | Ye et al. | 363/21.04 |
| 2009/0189455 A1* | 7/2009 | Rusan et al. | 307/82 |
| 2009/0190279 A1* | 7/2009 | Rusan et al. | 361/93.6 |
| 2009/0228223 A1* | 9/2009 | Liu et al. | 702/59 |
| 2010/0172063 A1* | 7/2010 | Liu et al. | 361/118 |

* cited by examiner

GROUND FAULT INTERRUPTION USING DSP BASED SSPC MODULE

CROSS-REFERENCE TO RELATED APPLICATIONS

This application claims the benefit of U.S. Provisional Application No. 60/896,213 filed Mar. 21, 2007.

BACKGROUND OF THE INVENTION

The present invention is in the field of ground fault interrupters (GFI's) and, more particularly, GFI's in power distribution systems which operate in vehicles such as aerospace vehicles.

In modern day aerospace vehicles, power distribution systems may incorporate ground fault protection. In a typical prior art vehicle, current transformers are employed as part of the apparatus needed to detect current variations and interrupt current if and when a ground fault event occurs. Prior art ground fault interruption (GFI) is realized by detecting differential current using a current transformer, comparing the differential current with a threshold value, and interrupting current from a power source through a remote power controller when the differential current exceeds the threshold value. Current transformers are expensive and their use adds weight to an aerospace vehicle. Also use of current transformers increases system interconnection complexity and reduces flexibility of SSPC system. As is the case for virtually any type of complexity, interconnection complexity may present opportunities for failures and may contribute to reduced overall reliability of a power system of an aerospace vehicle.

An alternate method to current transformer type GFI is provided by performing current sum digitally. But, many aerospace vehicles employ multi-phase power distribution (e.g. 3 phase power). Precision of the digital current sum GFI performance may be affected by errors in detecting actual current differentials between respective phases. Phase angle variations may produce one form of current differential error. Also current transformers may not be capable of perfectly representing actual current in a phase. Collectively, these factors may produce a current differential error. Presence of such potential errors in detecting actual current may adversely affect the precision with which prior art GFI systems may operate.

In order to avoid false tripping, a GFI device or system must be allowed to ignore a current differential that is equal to or less than an error differential. For example, if an error differential has a potential for appearing as a current variation of 1% between phases, then a GFI trip level must be set so that the GFI operates only after an actual current variation or current reading differential exceeds 1%.

As aerospace vehicles evolve, there is an increased demand for lower weight of components. There is also a developing need for increased reliability of individual systems because there are an increasing number of systems being incorporated into aerospace vehicles. Overall reliability of vehicles with an increasing number of systems may only be sustained if reliability of each system is improved. In that context, interconnection complexity associated with use of current transformers for GFI functions is counterproductive.

As can be seen, there is a need to provide for ground fault interruption without use of current transformers. There is also a need to provide trip levels of ground fault interruption devices lower than prior-art differentials in multi-phase power systems.

SUMMARY OF THE INVENTION

In one aspect of the present invention a power distribution control system with ground fault interruption (GFI) protection comprises a current measurement sensor for a first conductor, a current measurement sensor for a second conductor, analog to digital converters to convert current measurements to a first digital representation of current in the first conductor and to a second digital representation of current in the second conductor, and a digital processor that receives the first and second digital representations. The processor calculates differentials between the digital representations and produces a current interruption signal in the event that a calculated differential exceeds a pre-defined value.

In another aspect of the present invention a control system for multi-phase power distribution with ground fault interruption (GFI) protection comprises a plurality of DSP based trip engines which perform instantaneous sampling of current values of each power feeder of the multi-phase power distribution system. The trip engines produce digital representations of the sampled current values. A processor is interconnected with the trip engines to receive the digital representations and determine if a differential between current values of the power feeders exceeds a predefined limit. Solid-state switches are interconnected with each of the trip engines to interrupt current in the power feeders upon receiving a switch-off signal from an associated one of the trip engines, which switch-off signal is generated responsively to a determination by the processor that the differential exceeds the predefined limit. GFI protection is thus provided without use of current transformers.

In still another aspect of the present invention a method for performing ground fault interruption (GFI) functions comprises the steps of measuring a first current in a first conductor, measuring a second current in a second conductor, producing a first digital representation of the measured first current, producing a second digital representation of the measured second current, calculating a differential between the first and the second digital representations, and interrupting current through at least one of the conductors in the event that the differential exceeds a predefined level.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful in providing ground fault protection in a power distribution system. More particularly, the present invention may provide accurate ground fault protection in multi-phase power distribution systems. The present invention may be particularly useful in aerospace vehicles.

In contrast to prior-art ground fault interruption (GFI) systems, among other things, the present invention may provide light weight, non-complex and accurate GFI functionality. The present invention, instead of utilizing heavy current transformers and interconnecting circuitry, may provide GFI functions incorporated as an ancillary feature of a power distribution control line-replaceable-module (LRM) that may otherwise already be incorporated into a design of the vehicle. Consequently, the inventive system for performing GFI functions may be introduced into an aerospace vehicle while adding virtually no weight to the vehicle. Additionally, because the inventive GFI system is based on digital signals processors (DSP's). GFI functionality may be provided with trip level accuracies that exceed those of the prior art.

Figure 1:
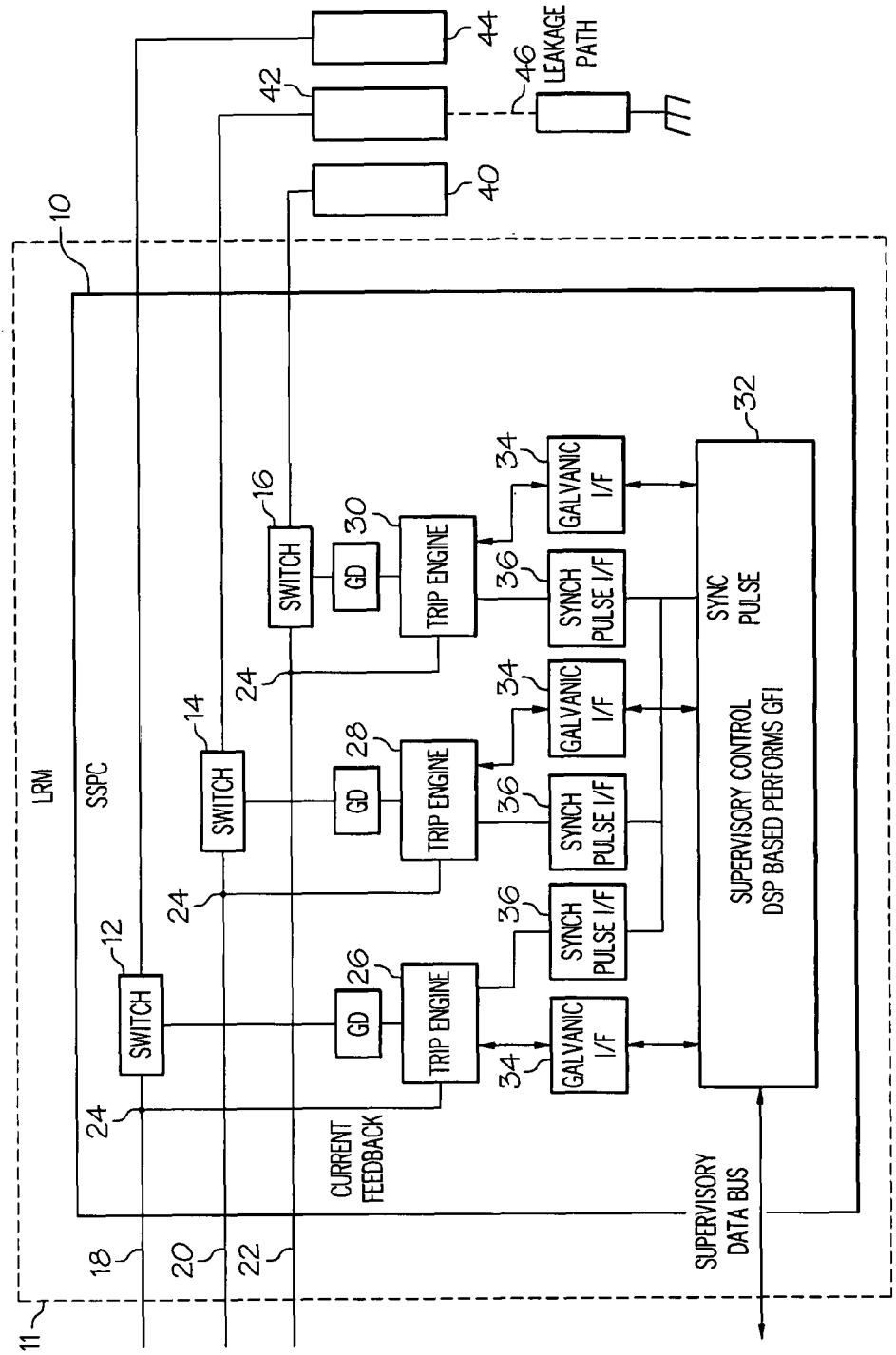
FIG. 1 is a block diagram of a GFI-protected power distribution system in accordance with the present invention.

Referring now to FIG. 1, there is shown a system for providing ground fault interruption (GFI) protection for a power distribution control system 10. The power distribution control system 10 may be a solid state power control (hereinafter SSPC 10). The SSPC 10 may be incorporated into a Line Replaceable Module (hereinafter LRM) 11 that may be employed on an aerospace vehicle for power distribution control. The SSPC 10 may comprise power switches 12, 14 and 16. The switches 12, 14 and 16 may comprise conventional solid state switching devices such as metal oxide field effect transistors (MOSFET's). The power switches 12, 14 and 16 may be positioned to interrupt current in conductors or power feeders 18, 20 and 22, respectively. The power feeders 18, 20 and 22 may be interconnected, through current feedback sensors 24, to trip engines 26, 28 and 30 respectively. A processor such as a supervisory control unit 32 may interconnected to the trip engines 26, 28, and 30 through galvanic interfaces 34 and synchronization pulse interfaces 36. Each of the power feeders 18, 20 and 22 may comprise one phase of a multi-phase power distribution system.

In the exemplary configuration of FIG. 1, the power feeders 18, 20 and 22 may be interconnected to power loads 40, 42 and 44. One of the power loads, the power load 42 as an example, is illustrated, symbolically, with a leakage path 46 going to ground. For purposes of illustration the present invention is described in the context of the leakage path 46 developing between ground and the power load 42.

In operation, the trip engines 26, 28, and 30 may periodically perform sampling operations and acquire instantaneous current readings from the current feedback sensors 24. The sampling operations may be performed at intervals of 1 milliseconds (msec) to 5 msec between each sampling operation. The trip engines 26-30 may then transmit a digital representation of the current reading to the supervisory control unit 32. The supervisory control unit 32 may then perform a current sum calculation. A fault may be declared when current differential between phases (a so-called sum error) exceeds a predefined limit for a predefined period of time. Typically, such a sum error may be found when ground leakage current develops between one of the loads 40, 42 or 44 and ground and when such leakage current continues for two or more of the periodic sampling operations of the trip engines 26, 28 and 30.

In the event of a fault declaration, the supervisory control unit 32 may produce a current interruption signal and transmit the signal to the trip engines 26, 28 and 30. The signaled trip engines 26, 28 and 30 may then produce switch-off signals for transmission to their respective power switches 12, 14 and 16. The power switches 12, 14 and 16 may then interrupt current flowing through the power feeders 18, 20 and 22.

Figure 2:
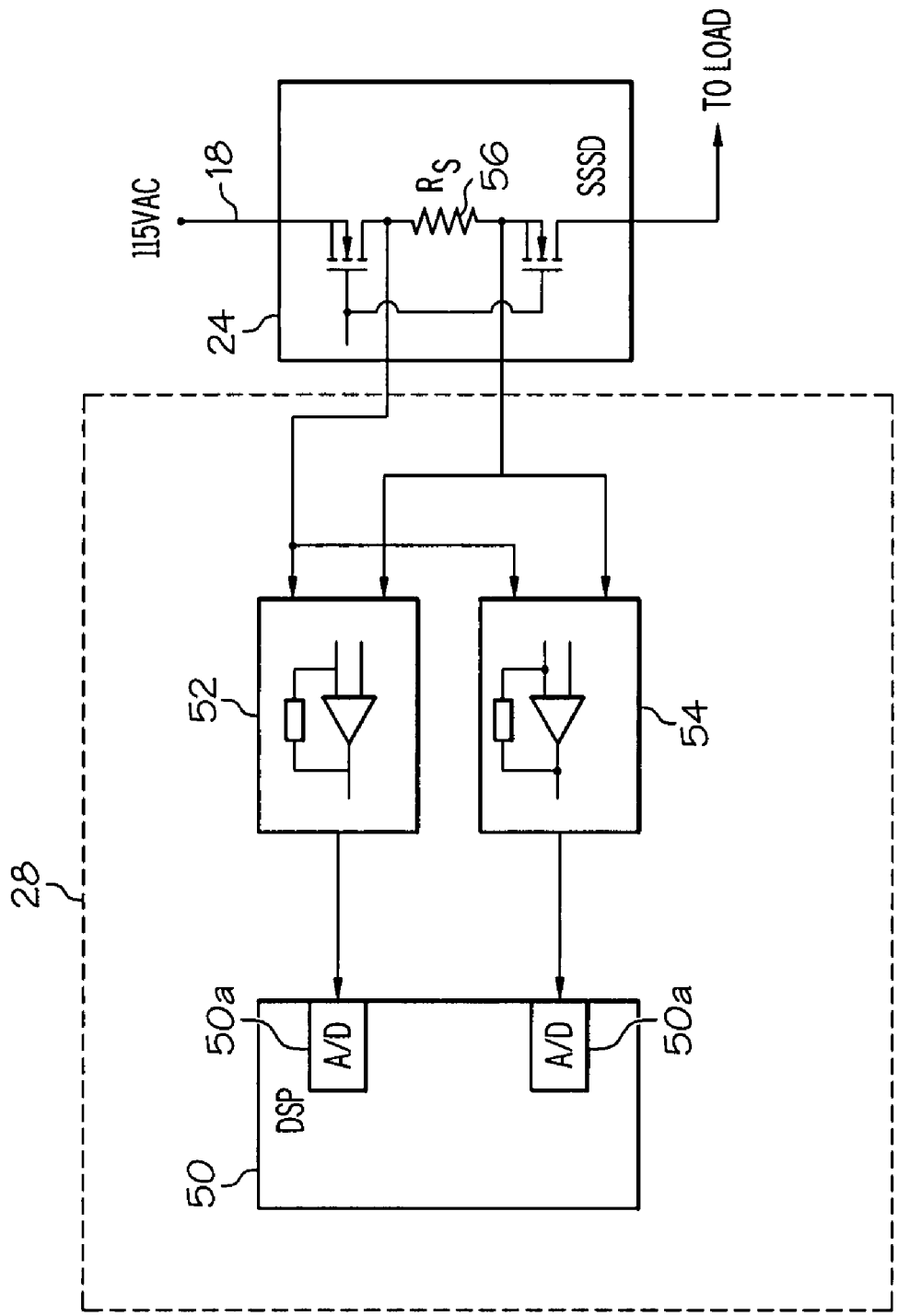
FIG. 2 is a block diagram of a portion of the system of FIG. 1 in accordance with the present invention.

Referring now to FIG. 2 there is shown a drawing of one of the trip engines, in an exemplary case, the trip engine 28. The trip engine 28 is described herein in its role as providing GFI protection. It should be noted that the trip engine 28 need not be dedicated exclusively to GFI functionality. The trip engine 28 may also perform other power control tasks of the SPPC 10. For example, the trip engine 28 may perform a circuit breaker function (not described herein) or a contactor control function (not described herein) in addition to the GFI function which is presently being considered herein.

The trip engine 28 may comprise a DSP 50 and one or more current processing blocks 52 and 54 which are tuned to process differing ranges of currents. The current processing blocks 52 and 54 may be interconnected with the DSP 50 through analog to digital (A/D) converters 50a. The current processing blocks 52 and 54 may be interconnected with a current sensing resistor 56 of one of the current sensors 24.

The current processing block 52 may be tuned to process current feedback in a range of zero to nominal current. For example, if the SSPC 10 is set with a 15 ampere (A.) range, the current processing block 52 might be tuned to process currents up to 10% greater than 15 A. The current processing block 54 may be configured to process current that may be higher than nominal. For example, if the SSPC 10 is set with a maximum trip rating of 1000%, then the current processing block 54 may be tuned to process currents up to 1000% of 15 A or 150 A. Tuning as described above may be accomplished by constructing the current processing blocks 52 and 54 with components which are selected for particular current ranges in a manner familiar to those skilled in the art of power distribution control.

Referring back now to FIG. 1, the utility of the synchronization pulse interfaces 36 may be better understood. The supervisory control unit 32 may be interconnected with the trip engines 26, 28 and 30 through the synchronization pulse interfaces 36. Because of this interconnection the supervisory control unit 32 may provide a synchronization pulse through one of the synchronization pulse interfaces 36 to each of the trip engines 26, 28, and 30. Upon receiving the synchronization pulse, each of the trip engines 26, 28, and 30 may acquire instantaneous readings of current feedback from their respective power feeders 18, 20 and 22.

The trip engines 26, 28 and 30 may then transmit the digital representations of their respective current readings to the supervisory control unit 32. The supervisory control unit 32 may then perform conventional current sum calculations based on these digital representations to determine if a ground fault should be declared.

Because instantaneous readings of current may be made periodically on a sampling basis, current sum calculations may be prone to certain inaccuracy. This inaccuracy may result if phase differential is allowed to develop between samplings of current. Synchronization pulses reduce such inaccuracy by providing timing coordination between all of the trip engines 26, 28 and 30.

If each of the trip engines 26, 28 and 30 were to sample current based on its own independent timing, the current samplings might be performed at slightly different times. If the trip engine 26, for example, sampled current at a time ($T_0$) different from a sampling time ($T_1$) of trip engine 28, there may a change in phase angle of the power transmitted within the power feeders 18 and 20 during the time interval $T_0$ minus $T_1$. Consider for example, a 50 microsecond (μsec) time differential that may be experienced between current samplings. At 400 Hertz (Hz) this time differential may correspond to a phase differential of 7 degrees. This may translate to an error of 1% in the current sum calculation. At 10 A of phase current, the 1% error may correspond to 100 milliamp (mA.). A 100 mA error may be unsuitable for many aerospace vehicle applications.

If a phase differential error of 100 mA were to develop as described above, GFI functionality would need to be withheld for any current differential lower than 100 mA. In other words, any ground-fault induced current differential lower than 100 mA would need to be treated as not representative of a ground fault event. Thus an actual ground fault event that produced a current differential of 75 mA would not trigger a current interruption action in this example.

A modest reduction of magnitude of such an error may be provided by increasing sampling rate but this may produce an intolerable processing load. A more desirable way of reducing this error is through a synchronization scheme of the present invention.

The supervisory control unit 32 may emit simultaneous synchronization pulses to each of the trip engines 26, 28 and 30. The synchronization pulses may provide commands to the trip engines 26, 28 and 30 to sample current in their respective power feeders 18, 20 and 22. This may assure that sampling from all phases is performed virtually simultaneously. The time differences between current samplings by the trip engines 26, 28 and 30 may be reduced to an interval of 500 ns to 1000 ns. This corresponds to an error of 0.07 degrees or a 0.0008% error. At 10 A, this is only 0.1 mA error. In this inventive synchronization pulse mode of operation, GFI functionality may be allowed to proceed for any current differential greater than 0.1 mA.

A further improvement in operational accuracy of the trip engines 26, 28 and 30 may be achieved by individually calibrating each of the DSP's 50 against a known resistance at the time that the LRM's 10 are manufactured. A calculated gain may be determined for each individual DSP 50 and stored in a conventional non-volatile memory (not shown) within the individual DSP 50. In this way, compensation may be made for any physical variations of one of the DSP's 50 as compared to any of the other DSP's 50.

Figure 3:
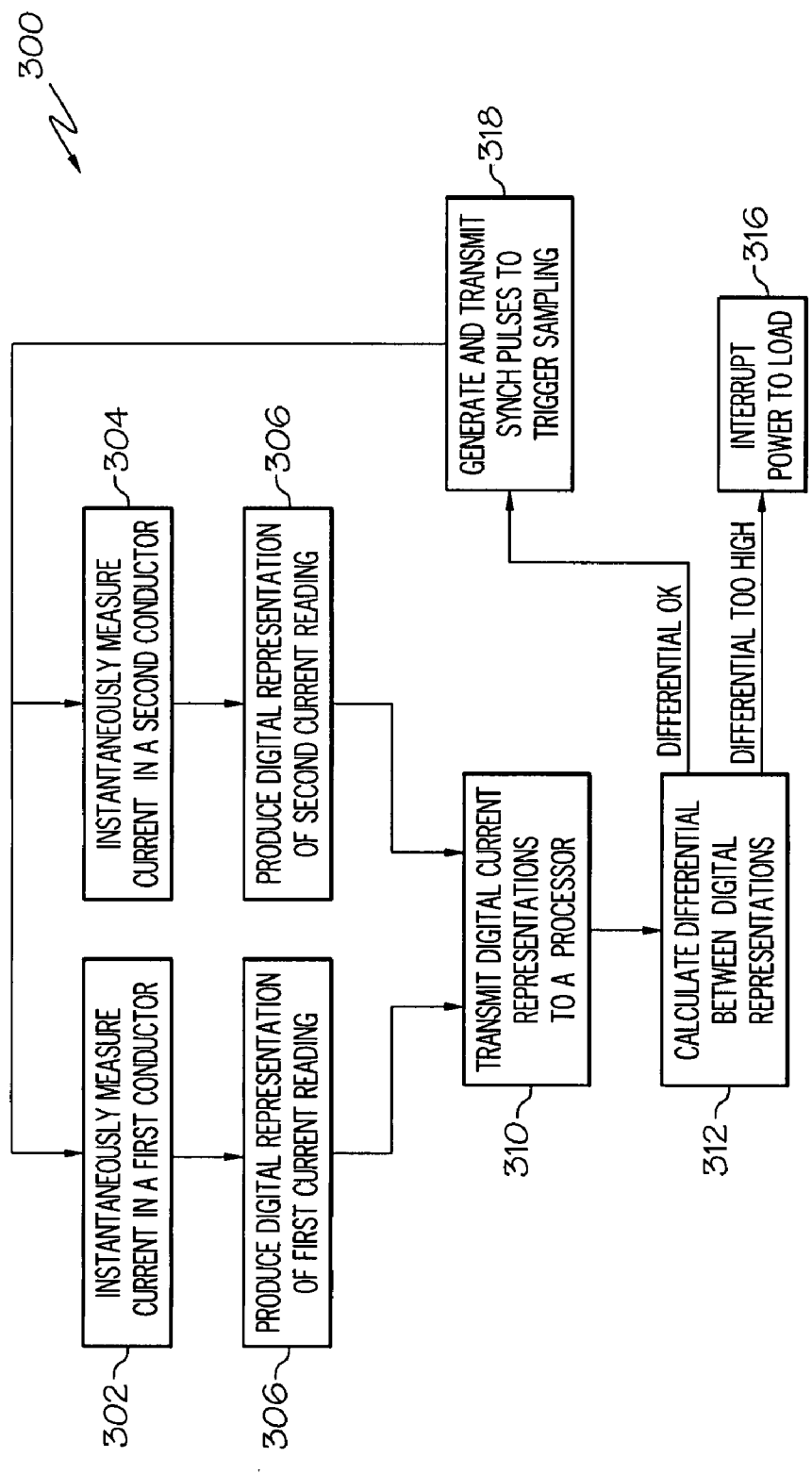
FIG. 3 is a flow chart of a method providing ground fault interruption functionality in accordance with the present invention.

In one embodiment of the present invention, a method is provided for GFI functions, for example, on an aerospace vehicle. In that regard, the method may be understood by referring to FIG. 3. In FIG. 3, a flow chart portrays various aspects of an inventive method 300. In a step 302, current in a first power feeder (e.g. the power feeder 18) may be instantaneously measured (e.g., by use of one of the feedback sensors 24 and the trip engine 26). In a step 304, current in a second power feeder (e.g. the power feeder 20) may be simultaneously measured (e.g., by use of one of the feedback sensors 24 and the trip engine 28). In a step 306, a digital representation of the current in the first power feeder may be produced (e.g. in the A/D converter 50a). In step 308, a digital representation of the current in the second power feeder may be produced in the same manner as step 306. In a step 310, the digital current representations may be transmitted (e.g. from the A/D converter 50a) to a processor (e.g. the supervisory control unit 32). In a step 312, a calculation may be performed (e.g. in the supervisory processor 32) to determine a differential between the digital representations of currents in the first and second power feeders.

In the event that the differential calculated in step 312 exceeds a predefined level for a predetermined time interval, a step 316 may be initiated by which power transmission to a load through the first and second power feeders may be interrupted (e.g. by operation of the trip engines 26 and 28 and the power switches 12 and 14). In the event that the calculated differential is below the predefined level or does not continue beyond the predetermined time, the interruption step 316 may not be performed. In that case, a step 318 may be performed in which synchronization pulses may be generated and transmitted to trigger operation of steps 302 and 304 in which the trip engines may perform current sampling.

It should be noted that the step 318 may be performed by generating a separate synchronization pulse for each of the trip engines. In this way current differential error associated with phase differential may be substantially reduced as described hereinabove.

It should also be noted that the foregoing description of the method 300 discusses an exemplary collection of only two power feeders. It should be clear to those skilled in the art that the method 300 may be practiced with any number of power feeders and that current differentials among any combinations of power feeders may be used to trigger GFI functions It should be understood, of course, that the foregoing relates to exemplary embodiments of the invention and that modifications may be made without departing from the spirit and scope of the invention as set forth in the following claims.

We claim:

1. A power distribution control system with ground fault interruption (GFI) protection, comprising:
    a current measurement sensor for a first conductor;
    a current measurement sensor for a second conductor;
    analog to digital converters to convert current measurements to a first digital representation of current in the first conductor and a second digital representation of current in the second conductor;
    a digital processor that receives the first and second digital representations, calculates differentials between the digital representations and produces a current interruption signal in the event that a calculated differential exceeds a pre-defined value;
    a solid state switch;
    a trip engine that receives the current interruption signal from the digital processor and produces a switch-off signal to operate the switch;
    a synchronization pulse interface interconnected between the trip engine and the digital processor; and
    a plurality of periodic sampling trip engines that perform periodic sampling operations to gather current measurements from the current sensors,
    wherein the processor generates synchronization pulses to coordinate the sampling operation of the periodic sampling trip engines so that the current measurement sensors are sampled virtually simultaneously.

2. The system of claim 1 wherein all of the trip engines perform any one of the periodic sampling operations within a predetermined time interval between sampling operations.

3. The system of claim 1 further comprising:
    a third conductor; and
    wherein the conductors are components of a three phase power distribution system of an aerospace vehicle.

4. A control system for multi-phase power distribution with ground fault interruption (GFI) protection comprising:
    a plurality of DSP based trip engines which perform instantaneous sampling of current values of each power feeder of the multi-phase power distribution system and which produce digital representations of the sampled current values;
    a processor interconnected with the trip engines to receive the digital representations and determine if a differential between current values of the power feeders exceeds a predefined limit; and
    solid-state switches interconnected with each of the trip engines to interrupt current in the power feeders upon receiving a switch-off signal from an associated one of the trip engines, which switch-off signal is generated responsively to a determination by the processor that the differential exceeds the predefined limit, wherein:

GFI protection is provided without use of current transformers;

the processor produces synchronization pulses which coordinate timing of instantaneous sampling by the DSP based trip engines; and the synchronization pulses coordinate timing of current sampling operations of the trip engines so that all of the trip engines perform a sampling operation within a time interval between 50 ns and 100 ns between sampling operations.

5. The system of claim 4 wherein a switch-off signal is produced whenever the current differential between any two of the power feeders exceeds 0.1 mA.

6. The system of claim of claim 4 wherein the processor and the trip engines are components of a power distribution control LRM (line replaceable module) of an aerospace vehicle.

7. A method for performing ground fault interruption (GFI) functions comprising the steps of:

measuring a first current in a first conductor;

measuring a second current in a second conductor;

producing a first digital representation of the measured first current;

producing a second digital representation of the measured second current;

calculating a differential between the first and the second digital representations;

interrupting current through at least one of the conductors, in the event that the differential exceeds a predefined level, in response to digitally produced switch-off signals transmitted to at least one solid state switch which is interconnected with the at least one of the conductors to directly interrupt current in the at least one of the conductors; and producing a switch-off signal when the differential is as low as 1 mA.

8. The method of claim 7 further comprising a step of producing synchronization pulses to coordinate timing of the measuring steps.

9. The method of claim 7 wherein the steps of measuring are performed as sampling operations.

10. The method of claim 7 wherein the sampling operations are made as periodic instantaneous samplings.

11. The method of claim 10 wherein both of the measuring steps are performed within one sampling operation.

12. The method of claim 7 wherein:

the conductors are power feeders of a multi-phase power distribution system of an aerospace vehicle; and current in each of the power feeders is interruptible by an associated solid state switch.

13. The method of claim 7 wherein:

the conductors are power feeders of a multi-phase power distribution system;

the current measurements are performed as sampling operations;

sampling of the first current and sampling of the second current take place within a time interval that corresponds to a phase angle variation, between the first and second currents.

* * * * *